United States Patent [19]

Jones

[11] Patent Number: 4,571,009
[45] Date of Patent: Feb. 18, 1986

[54] PRE-PRESSURIZED ACCUMULATOR FOR HYDRAULIC BRAKE SYSTEM

[76] Inventor: Ed F. Jones, P.O. Box 141480, Spokane, Wash. 99214

[21] Appl. No.: 535,047

[22] Filed: Sep. 23, 1983

[51] Int. Cl.$^4$ .............................................. F16L 55/04
[52] U.S. Cl. .......................................... 303/87; 138/30
[58] Field of Search ............................. 138/30; 303/87

[56] References Cited

U.S. PATENT DOCUMENTS

| 3,378,036 | 4/1968 | Clayton | 138/30 |
| 3,430,660 | 3/1969 | Mitton | 138/30 |
| 3,612,105 | 10/1971 | Martin | 138/30 |
| 3,757,825 | 9/1973 | Givens et al. | 303/87 X |

FOREIGN PATENT DOCUMENTS

| 1373140 | of 1964 | France | 303/87 |
| 911265 | of 1962 | United Kingdom | 138/30 |

Primary Examiner—Stephen Marcus
Assistant Examiner—Mark Thronson
Attorney, Agent, or Firm—Wells, St. John & Roberts

[57] ABSTRACT

Disclosed is an accumulator for use on hydraulic brake systems. The accumulator includes a housing, a pressurization cap which is threadably connected into the housing and a resilient bulb contained within a volume between the housing and pressurization cap. The resilient bulb provides a flexible volume which can expand in response to high pressure surges and shock waves experienced by the braking system. The bulb is contained primarily within an interior cavity formed in the pressurization cap. The resilient bulb is constructed in a size and shape which causes an annular volume between the bulb and pressurization cap to be pre-pressurized when the accumulator is assembled together. The accumulator is also provided with a particularly effective sealing arrangement to prevent leakage of air and hydraulic fluid from around the bulb.

11 Claims, 3 Drawing Figures

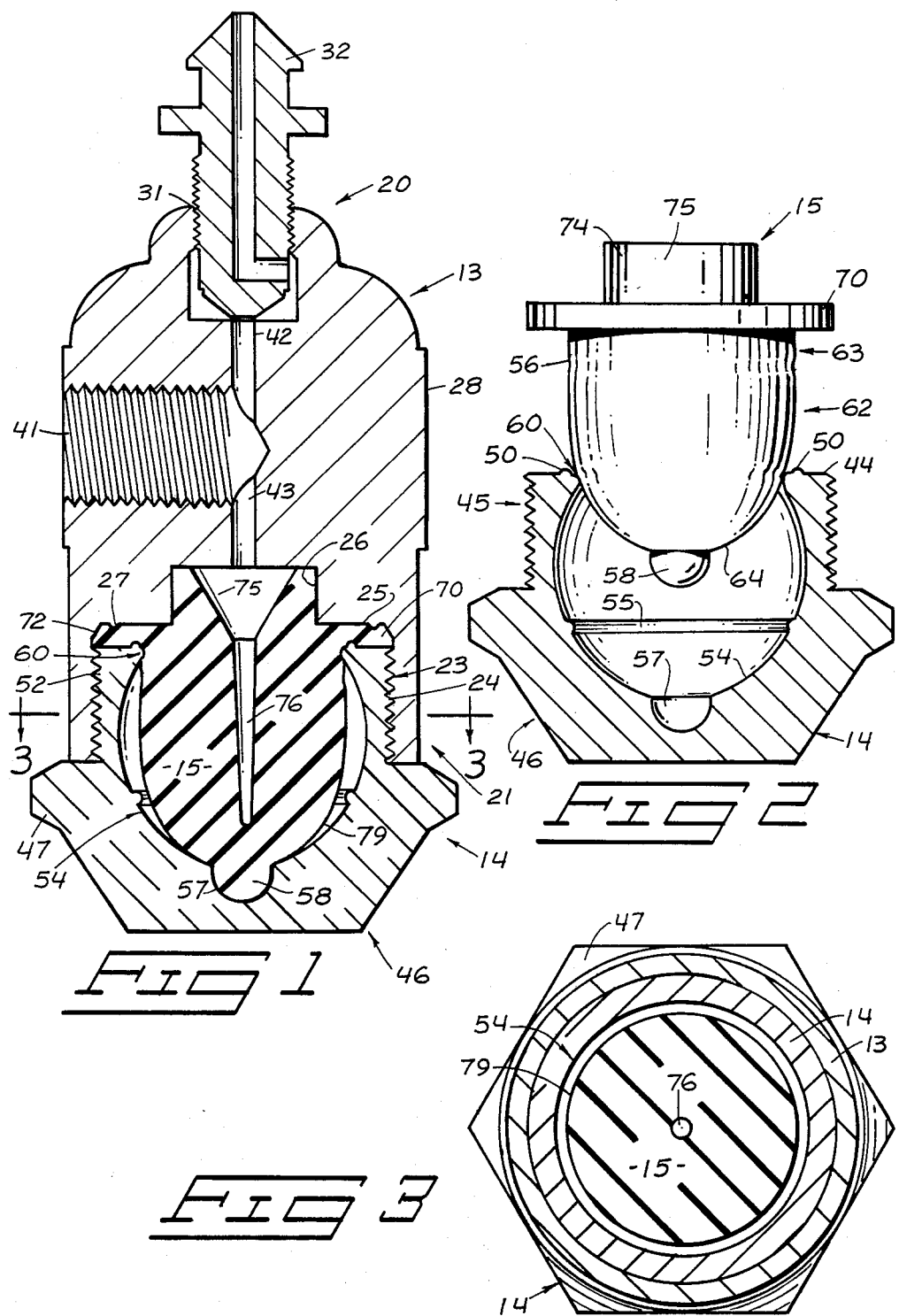

PRE-PRESSURIZED ACCUMULATOR FOR HYDRAULIC BRAKE SYSTEM

TECHNICAL FIELD

The technical field of this invention is accumulators for hydraulic brake systems.

BACKGROUND OF THE INVENTION

Hydraulic brake systems are used on most automobiles and many trucks. In such systems there are either brake shoes or brake calipers which engage a brake drum or brake disc. The service of brake drums and discs places them under substantial forces which invariably lead to distortion and lack of circularity. When this happens the brake shoes or discs are unable to brake as effectively because they tend to hop or skip off of the high points on the distorted brake drum or disc. The noncircularity of the drums and discs also cause pressure waves in the hydraulic brake systems which can further aggravate easy control of the system. Brakes also tend to lock more easily because of the cyclical increases in the forces between the shoes and the drum.

It has been previously known that a small accumulator or pressure equalizing device is effective for reducing pressure surges in hydraulic braking systems. Such devices are also effective in helping to equalize the pressure experienced by each brake cylinder. U.S. Pat. No. 3,430,660 to Mitton shows such a pressure equalizer apparatus. The Mitton invention has a resilient bulb which is held within a housing. The bulb is contained within a concave void which allows the side walls of the bulb to flex outwardly when greater pressures are experienced in an interior bore. Although this design has proven to be useful, it has suffered from limitations and failures, including early failure of the resilient bulbs and sealing failures between the bulb and the housing components.

Failure of the resilient bulbs has been analyzed to determine that bulb flexing exceeds a desirable range for the size and type of resilient material being used. It has also been found that cracking occurs because of the stress arising at sharpened points of engagement between the bulb and the surrounding housing. The current invention seeks to solve the bulb cracking problems by providing a bulb and housing which are specifically designed to cause the concave area around the bulb to become pressurized when the accumulator is assembled. The invention is also directed to providing a superior seal arrangement so that the accumulator does not leak either air or hydraulic fluid. Other objects and features of the invention will be given in the following detailed description of the invention.

BRIEF DESCRIPTION OF THE DRAWINGS

A preferred embodiment of this invention is illustrated in the accompanying drawings, in which:

FIG. 1 is a side cross-sectional view of an accumulator according to this invention;

FIG. 2 is a side cross-sectional view showing the plug and pressurization cap of FIG. 1 in the process of being assembled; and FIG. 3 is a cross-sectional view taken along line 3—3 of FIG. 1.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

The accumulator of this invention includes three principal components. They are a housing 13, pressurization cap 14, and resilient bulb 15.

Housing 13 has a bleed port end 20 and a receptacle end 21. Receptacle end 21 is provided with a cap receptacle 23 which is preferably threaded such as by threads 24. Cap receptacle 23 has a dome region 25 and a cup region 26 at the upper end, as shown in FIG. 1.

At the bleed port end of housing 13, there is a bleed port 31 which is preferably provided with threads. FIG. 1 shows bleed port 31 furnished with a bleed valve 32 as is well known in the art.

Housing 13 is also provided with a brake line port 41 for connecting the accumulator to a vehicular hydraulic brake system (not shown). The brake line port 41 extends into housing 13 sufficiently far to connect with interior passageways 42 and 43. Interior passageways 42 and 43 provide hydraulic connection between bleed port 31, brake line port 41, and the cup region 26 of cap receptacle 23. Brake line port 41 is shown threaded but can be adapted to connect to the brake system in many different ways.

Pressurization cap 14 has an interior end 45 and an exterior end 46. Interior end 45 is preferably provided with a sealing bead 50 (FIG. 2) which extends in a circular fashion around the end face 44 of interior end 45. Pressurization cap 14 also has exterior threads 52 at interior end 45 which engage with interior threads 24 of cap receptacle 23. Pressurization cap 14 is preferably provided with a hexagonal nut portion 47 or some other wrench-engaging means thereby allowing the housing 13 and pressurization cap 14 to be tightly threaded together.

Pressurization cap 14 also includes a concave interior cavity 54 which is approximately circular in cross-sectional shape as shown in FIG. 3. Interior cavity 54 is longitudinally concave as shown in FIG. 1. This longitudinal concavity of cavity 54 allows the resilient bulb 15 to expand outwardly when exposed to high pressure. The bottom end of interior cavity 54 can advantageously be provided with a button recess 57 for receiving an end button 58 on the end of bulb 15. Interior cavity 54 can also be provided with a ridge 55 (FIG. 2). Ridge 55 supports the bulb when it expands outwardly thereby changing the amount of deflection which will occur in the bulb above the ridge. This increases the maximum amount of pressure the bulb can withstand while still performing its resilient function. It also effectively gives the bulb two stages of resiliency with the bulb being initially more flexible and then of less flexibility after the bulb contacts the ridge 55.

Interior cavity 54 is enclosed within pressurization cap 14 except at a cavity opening 60 at interior end 45. The edges of cavity opening 60 are smoothly curved to prevent unnecessary cutting action to the resilient bulb 15. The concave sides of interior cavity 54 are also smoothly and concavely shaped from the cavity opening 60 to the button recess 57 except at ridge 55. The smooth contours help to reduce the risk of cracks, cuts and wear of resilient bulb 15.

Resilient bulb 15 has an insertable plug 62 which is inserted within interior cavity 54 of the pressurization cap. Insertable plug 62 has a proximate end 63 and a distal end 64. The insertable plug preferably tapers from the proximate end 63 to a smaller cross-sectional size near distal end 64. The plug (62) has a cross-sectional size larger than the cavity opening (60) over more than half the length of the plug (62). The distal end 64 is sized to snugly contact cavity opening 60 near the distal end, as shown in FIG. 2, to form a seal therewith. Insertable plug 62 can be tapered in a non-linear convex fashion so that there is very little or even negative taper (reduced diametrical size) near the proximate end. Such a shape provides for greater holding power of the plug within interior cavity 54 and also more nearly conforms to the longitudinally concave shape of the interior cavity. Bulb 15 can advantageously include a groove 56 (FIG. 2) which aids in assembly of the accumulator as will be explained below.

Bulb 15 also includes a flange 70 which is attached to the insertable plug at the proximate end 63. Flange 70 fits between the dome region 25 of housing 13 and the interior end 45 of the pressurization cap, when the accumulator is fully assembled. FIG. 1 shows how flange 70 is used to seal between the housing 13 and pressurization cap 14.

A cap sealing bead 50 on the interior end of the pressurization cap engages the bottom of flange 70 along a circular line of contact. In similar fashion, a dome sealing bead 27 on the dome region engages the upper side of flange 70 along a circular line of contact. The diameter of dome sealing bead 27 is greater than the diameter of the cap sealing bead 50, to provide a particularly advantageous type of sealing arrangement. In this arrangement bead 27 bears down along a line between the edge of cavity opening 60 and the perimeter of flange 70. Another part of the sealing arrangement is the chamfered corner seal 72 formed along the outer perimeter of dome region 25 to compress the outer edge of flange 70. Corner seal 72 in combination with sealing beads 27 and 50, provide three high pressure contact lines upon the flange, thereby producing a very tight seal for both the air which is contained within interior cavity 54 and the hydraulic fluid which passes through the interior passageways 42 and 43.

Bulb 15 is provided with a flared top 74, which extends into cup region 26 formed in the end of cap receptacle 23. Flared top 74 is approximately cylindrically shaped along the outer or exterior surface. The end of flared top 74 is opened at a flared opening 75, which connects with an interior void 76. Flared top 74 also acts as a seal with cup region 26 when hydraulic pressure forces it outwardly against cup region 26.

In operation hydraulic brake fluid is contained within the interior passageways 42 and 43, flared opening 75, and interior void 76. When shock waves and high pressure surges occur in the brake system, the accumulator provides additional volume in the system when bulb 15 flexes outwardly in response to the increased pressure existing within interior void 76.

Bulb 15 and pressurization cap 14 are constructed so that insertion of insertable plug 62 causes a pre-pressurization of the air existing within the annular volume 79 between the outside of bulb 15 and the surface of cavity 54. Pre-pressurization of the air in this volume starts when the insertable plug is inserted into cavity opening 60. A seal is formed by the plug across the cavity opening thereby preventing the escape of air contained within the cavity. (See FIG. 2) As the insertable plug 62 is forced further into the interior cavity 54, the amount of available volume for the air to fill is greatly reduced. Since the air cannot escape because opening 60 is sealed, the air is pressurized.

The pre-pressurization within annular volume 79 creates a restraining pressure about the exterior of insertable plug 62. The purpose of this pre-pressurization is to provide resilient but increased restraint when pressure surges are experienced by interior void 76. Greater pressure in the annular volume 79 due to pre-pressurization necessarily means that there will be less deflection of insertable plug 62 for a given amount of pressure increase within void 76. This reduces wear of the plug and prevents breakage and cracking.

The housing and pressurization cap are preferably made of aluminum or some other metal and the resilient bulb is preferably made from butyl synthetic rubber or some other resilient material. Many different materials are possible for all three parts.

The accumulator is assembled by first starting plug 62 into opening 60 in a manner similar to that shown in FIG. 2. The plug is preferably lubricated with water, molybdenum disulfide or some other suitable lubricant. The plug is installed by first pressing it inwardly by hand sufficiently far to allow the cavity opening 60 to to catch in groove 56. The threads of the pressurization cap are then engaged with the threads of the cap receptacle. Once threads 52 and 24 engage, then the pressurization cap 14 can be fully threaded into cap receptacle 23 of housing 13. This causes plug 62 to be forced into the interior cavity 54 as the parts assume the configuration shown in FIG. 1.

Once assembled, the accumulator of this invention is then used by installing it into a brake system at a branch line or directly in-line using bleed port 31 without bleed valve 32. The brake system is preferably provided with a fitting which can be received within brake line port 41, so that the accumulator can then be attached directly to the brake system, using port 41. After installation, brake fluid is pumped into the accumulator and the bleed valve 32 is used to remove any entrapped air from the system. Bleed valve 32 is then tightly sealed and the system is ready for operation.

During normal operation, pressures within the braking system will stay relatively low and there will be very little flexing of the bulb 15 in response to such pressures. When the brakes are applied quickly, then there may be high pressure surges which will cause insertable plug 62 to flex outwardly against the air pressure contained within annular volume 79. Because of the pre-pressurization feature of this invention, there will be less flexing of the plug for a given amount of pressure applied within interior void 76. Sealing beads 50 and 27, and chamfer corner seal 72 will very securely seal the air within interior cavity 54 and the hydraulic fluid within the interior passageways 42, 43 and their connected ports and openings.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A hydraulic accumulator for use in hydraulic brake systems, comprising:
   a housing having a receptacle end and a bleed port end; the receptacle end having a cap receptacle therein;
   the housing also having a bleed port near the bleed port end, the bleed port being hydraulically connected to the cap receptacle by interior passageways;
   the housing further having a brake line port for connecting the accumulator to a hydraulic brake system; the brake line port being hydraulically connected to the cap receptacle and bleed port by interior passageways;
   a pressurization cap having an interior end, an exterior end, and adapted adjacent the interior end for being received into and connected with the cap receptacle of the housing; the pressurization cap having a concavely shaped interior cavity therein which is open only at the interior end of the pressurization cap at a cavity opening;
   a resilient bulb having an insertable plug, flange and top; the insertable plug being positioned within the interior cavity of the pressurization cap; the flange extending radially outward over at least an end face of the interior end of the pressurization cap; the flange being interposed between said end face and the housing;
   the top of the resilient bulb being received within the cap receptacle; the top having a bulb opening extending into an interior void in the resilient bulb; the bulb opening and interior void being hydraulically connected by interior passageways to the bleed port and brake line port;
   the insertable plug, along a substantial length of said plug, being larger in cross-sectional size then said cavity opening to thereby seal therewith and cause air within the interior cavity to be pre-pressurized as the insertable plug is forced into position during assembly.

2. The accumulator of claim 1 wherein the insertable plug has a cross-sectional size larger than the cavity opening over more than half the length of the insertable plug, thereby causing the plug to form a seal across the cavity opening upon insertion thereinto; whereby further insertion of the plug causes pre-pressurization of the air contained in the cavity.

3. The accumulator of claim 1 further comprising a dome sealing bead formed on the cap receptacle, and a cap sealing bead formed on an end face of the interior end of the pressurization cap; the dome sealing bead having a diametrical size which is greater than the diametrical size of the cap sealing bead, the two beads engaging the bulb flange to form seals therewith to prevent leakage of air from the interior cavity and hydraulic fluid from the interior passageways.

4. The accumulator of claim 3 further comprising a chamfered corner seal formed upon the cap receptacle for compressing an outer edge of the flange to better seal against leakage.

5. The accumulator of claim 1 further defined by a ridge formed on the interior cavity for contacting the resilient bulb as the bulb expands outwardly.

6. A resilient bulb and pressurization cap combination for hydraulic brake accumulators, comprising:
   a resilient bulb having:
   a resilient insertable plug with a distal end, proximate end, approximately circular cross-sectional shape and an interior void; and
   a flange attached to the proximate end of the insertable plug for sealing;
   a pressurization cap having:
   an interior end, exterior end, interior cavity, and cavity opening connecting the interior cavity to the interior end; the cavity opening being larger in diametrical size than the distal end of the insertable plug and smaller in diametrical size than a substantial length adjacent the proximate end of the insertable plug, insertion of the insertable plug causing air within the interior cavity to be pre-pressurized during insertion.

7. The resilient bulb and pressurization cap combination of claim 6 further comprising a circumferential groove on the insertable plug adjacent to the flange for engaging with the cavity opening during assembly of the bulb with the pressurization cap.

8. The resilient bulb and pressurization cap combination of claim 6 further defined by a ridge formed on the interior cavity for contacting the resilient bulb as the bulb expands outwardly.

9. An accumulator for hydraulic brake systems, comprising:
   a housing having a cap receptacle, bleed port, and brake line port formed therein; said cap receptacle, bleed port and brake line port being hydraulically connected;
   a pressurization cap having an interior end which is adapted to be connected to the housing at the cap receptacle, the pressurization cap including a concavely shaped interior cavity therein which opens to the interior end of the pressurization cap at a cavity opening;
   a resilient bulb having an insertable plug, top, and flange thereon; the resilient bulb further including an interior void therein which is hydraulically opened through the top thereof; the resilient bulb being adapted for insertion of the insertable plug into the interior cavity of the pressurization cap to define an annular volume between the insertable plug and walls of the interior cavity;
   means for pre-pressurizing said annular volume above atmospheric pressure prior to use, to increase restraining pressure about the insertable plug of the resilient bulb, by having the insertable plug larger in cross-sectional size than said cavity opening, along a substantial length of said plug, and having the plug shaped similarly to said cavity opening whereby insertion of the insertable plug within the interior cavity forms an airtight seal about the cavity opening and pre-pressurizes said annular volume.

10. The accumulator of claim 9 further comprising a ridge formed upon walls of said interior cavity to engage the resilient bulb.

11. The accumulator of claim 9 wherein the insertable plug is circularly shaped in transverse cross section and is longitudinally convex along exterior sides thereof.

* * * * *